United States Patent
Krotosky

(10) Patent No.: US 11,206,465 B1
(45) Date of Patent: Dec. 21, 2021

(54) ADAPTIVE METHODS TO MINIMIZE DATA STORAGE AND DATA TRANSFER

(71) Applicant: Lytx, Inc., San Diego, CA (US)

(72) Inventor: Stephen Krotosky, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 16/834,110

(22) Filed: Mar. 30, 2020

(51) Int. Cl.
*H04Q 9/02* (2006.01)
*H04L 29/08* (2006.01)

(52) U.S. Cl.
CPC ............. *H04Q 9/02* (2013.01); *H04L 67/12* (2013.01); *H04Q 2209/826* (2013.01)

(58) Field of Classification Search
CPC ........ H04Q 9/00; H04Q 9/02; H04Q 2209/00; H04Q 2209/40; H04Q 2209/80; H04Q 2209/82; H04Q 2209/826; H04L 67/12
See application file for complete search history.

(56) References Cited

U.S. PATENT DOCUMENTS

| | | | | |
|---|---|---|---|---|
| 7,765,058 | B2* | 7/2010 | Doering | B60R 16/0236 701/123 |
| 8,855,621 | B2* | 10/2014 | Chen | B60R 25/00 455/420 |
| 9,836,056 | B2* | 12/2017 | Ansari | G06K 9/00805 |
| 10,192,171 | B2* | 1/2019 | Taylor | G06K 9/00832 |
| 10,569,771 | B2* | 2/2020 | Song | G06K 9/00798 |
| 2010/0060737 | A1* | 3/2010 | Lin | B60R 11/04 348/148 |
| 2019/0158581 | A1* | 5/2019 | Giannella | G06F 9/5061 |
| 2021/0009060 | A1* | 1/2021 | Huang | B60R 21/0134 |
| 2021/0056843 | A1* | 2/2021 | Kaur | G08G 1/0145 |

\* cited by examiner

*Primary Examiner* — Franklin D Balseca
(74) *Attorney, Agent, or Firm* — Van Pelt, Yi & James LLP

(57) ABSTRACT

A system for adaptive storage includes a storage memory and a processor. The processor is configured to determine, using a first model, one or more sampling rates for a second set of sensors based at least in part on input data from a first set of sensors. The first set of sensors and the second set of sensors are mounted on a vehicle. The processor is further configured to provide the one or more sampling rates to the second set of sensors and store data from the second set of sensors in the storage memory.

11 Claims, 17 Drawing Sheets

INPUT: Sensors indicate no captured signals of interest

OUTPUT: Record data from all sensors at minimum sampling rate

ADAPTIVE METHODS TO MINIMIZE DATA STORAGE AND DATA TRANSFER

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, global positioning system (GPS), etc., that report data, which is used to determine the occurrence of an anomalous event. Sensor data is then analyzed. The quality of the analysis depends in part on the quality of the recorded sensor data. For example, sensor data recorded at a higher sampling rate can produce a better quality of analysis. However, sensor data recorded at a higher sampling rate occupies too much of the data storage space within the vehicle event recorder, creating a trade-off problem where data should be recorded at a higher sample rate for better quality of analysis of a given anomalous event, but at a lower sample rate in order to save data storage space while there are no events occurring. Compounding the problem, each sensor of the set of sensors may have an independently controlled sample rate each of which has an appropriate rate for different circumstances, increasing the complexity of the problem.

BRIEF DESCRIPTION OF THE DRAWINGS

Various embodiments of the invention are disclosed in the following detailed description and the accompanying drawings.

DETAILED DESCRIPTION

Figure 1:
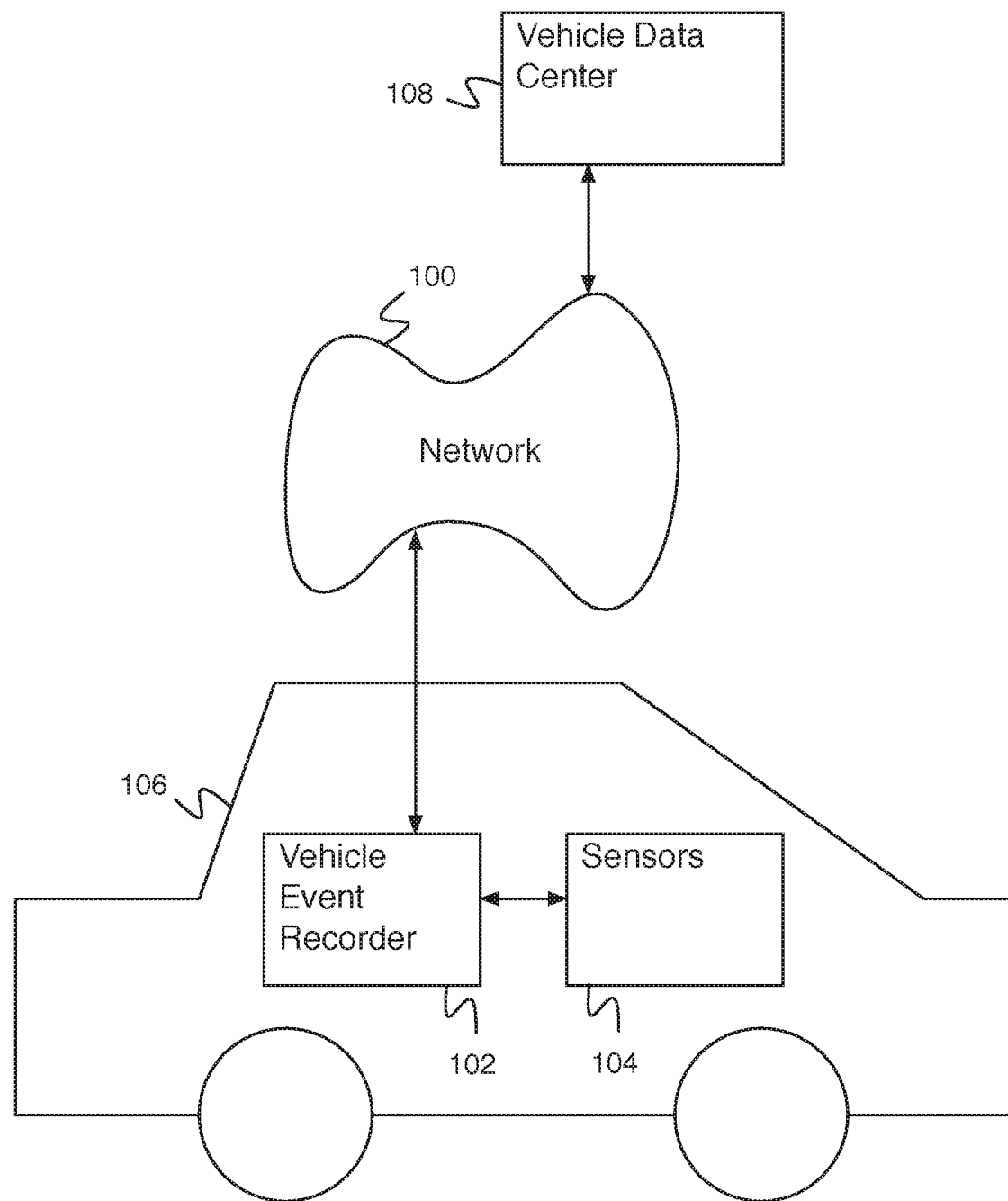
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for adaptive storage comprises a storage memory and a processor configured to determine, using a first model, one or more sampling rates for a second set of sensors based at least in part on input data from a first set of sensors, wherein the first set of sensors and the second set of sensors are mounted on a vehicle, provide the one or more sampling rates to the second set of sensors, and store data from the second set of sensors in the storage memory.

A system for adaptive storage comprises a system for determining a set of data sampling rates. The system for adaptive storage comprises a vehicle event recorder comprising a processor and a memory coupled to a plurality of sensors. The plurality of sensors comprise vehicle system sensors—for example, a speedometer, an engine control unit (ECU), a brake sensor, a forward distance sensor, a backward distance sensor, a lane sensor, etc., as well as externally added sensors—for example, an accelerometer, a GPS, internal and external microphones, internal and external video cameras (e.g., forward facing, rear facing, side facing, etc.), line tracking sensors, etc. Data from each sensor is received and stored by the vehicle event recorder. Data recorded at a higher sample rate allows for more meaningful data analysis, however, it consumes more data storage space on the vehicle event recorder. As there may be a large number of sensors, it is not practical to record data streams from all of the sensors at a high sample rate, thus, judgement must be used for determining when to raise and lower the sample rate for each sensor. By default, the sample rate for each sensor is low. Sensor data is analyzed and used to determine if a situation is occurring where it is desirable to raise the sample rate. For example, in the event a high g-force is measured by an accelerometer, sampling rate of external audio data and of ECU data are increased in order to ensure that an appropriately accurate analysis can be made confidently (e.g., a determination of whether the event corresponds to a crash event). The sampling rate determination is made by a machine learning model trained on data sets illustrating the use cases of interest.

In some embodiments, data from one or more sensors is initially stored in a buffer at a high sample rate. Data is transferred from the buffer to permanent storage after a predetermined amount of time. In the event it is determined by the model that the sensor data should be permanently stored at a lower sample rate, the data is transferred at the lower sample rate (e.g., only a subset of the samples are transferred, the data is resampled to the lower sample rate, the data is stored at a lower resolution, etc.). In some embodiments, the system comprises a second model for determining whether sensor data previously stored at a high sample rate should be reduced to a lower sampling rate (e.g., if it turned out that no anomalous event occurred). In response to determining that sensor data previously stored at a high sample rate should be reduced to a lower sampling rate, the stored data is reduced to a lower sampling rate (e.g., by removing some of the data samples, resampling the data, lowering the resolution of the data, etc.).

In some embodiments, the system for adaptive storage improves the vehicle event recorder computer system by automatically setting sensor data sample rates and/or storage sensor sample rates to effectively compromise between a need for high sampling rates for accurate measurement and/or analysis of anomalous events and low sampling rates at other times to conserve data storage space.

FIG. 1 is a block diagram illustrating an embodiment of a system including a vehicle event recorder. Vehicle event recorder 102 comprises a vehicle event recorder mounted in a vehicle (e.g., a car or a truck). Vehicle event recorder 102 is in communication with vehicle sensors 104. Vehicle sensors 104 comprises a set of sensors—for example, one or more video recorders (e.g., one or more forward facing video recorders, one or more side facing video recorders, one or more rear facing video recorders, one or more interior video recorders, etc.), audio recorders (e.g., one or more exterior audio recorders, one or more interior audio recorders), accelerometers, gyroscopes, vehicle state sensors, proximity sensors (e.g., a front distance sensor, a side distance sensor, a rear distance sensor, etc.), advanced driver assistance system sensors (ADAS sensors), a GPS, outdoor temperature sensors, moisture sensors, line tracker sensors (e.g., laser line tracker sensors), a lane change sensor, an AMBER alert sensor (e.g., a radio configured to receive AMBER alert data), etc. Vehicle state sensors comprise internal vehicle state sensors—for example a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, an ECU sensor, etc. Vehicle event recorder 102 comprises a system for receiving and processing sensor data. Processing sensor data comprises filtering data, identifying patterns in data, detecting events, etc. Vehicle event recorder 102 is mounted on vehicle 106 in any appropriate location—for example, the chassis, the front grill, the dashboard, the rear-view mirror, the rear window or wall, the floor, etc. There are times when vehicle event recorder 102 comprises multiple units mounted in different locations within vehicle 106 instead of a single unit, particularly when there are space constraints for a given location (e.g., behind the rear view mirror) and more space is required to house electronic components. Vehicle event recorder 102 comprises a communications system for communicating with network 100. Network 100 comprises a network for communications. In various embodiments, network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, etc. There are instances when network 100 comprises multiple networks—for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, a cellular data network has a high cost, etc.). In some embodiments, network 100 has a different cost at different times (e.g., a higher cost during the day and a lower cost at night). Vehicle event recorder 102 communicates with vehicle data server 108 via network 100.

When vehicle 106 travels, vehicle sensors 104 capture sensor data (e.g., video data, audio data, RADAR data, LIDAR data, accelerometer data, etc.). The sensor data is received by vehicle event recorder 102. For example, sensor data comprises digital data captured at a sampling rate—for example, a sampling rate indicated by vehicle event recorder 102. Vehicle event recorder 102 uses the sensor data to determine events (e.g., collision events, hazardous maneuver events, distracted driving events, etc.). Vehicle event recorder 102 additionally uses the sensor data to determine sampling rates for the sensor data capture. For example, vehicle event recorder 102 comprises a storage memory and a processor configured to determine, using a first model, one or more sampling rates for a second set of sensors based at least in part on input data from a first set of sensors, wherein the first set of sensors and the second set of sensors are mounted on a vehicle, provide the one or more sampling rates to the second set of sensors, and store data from the second set of sensors in the storage memory.

Figure 2:
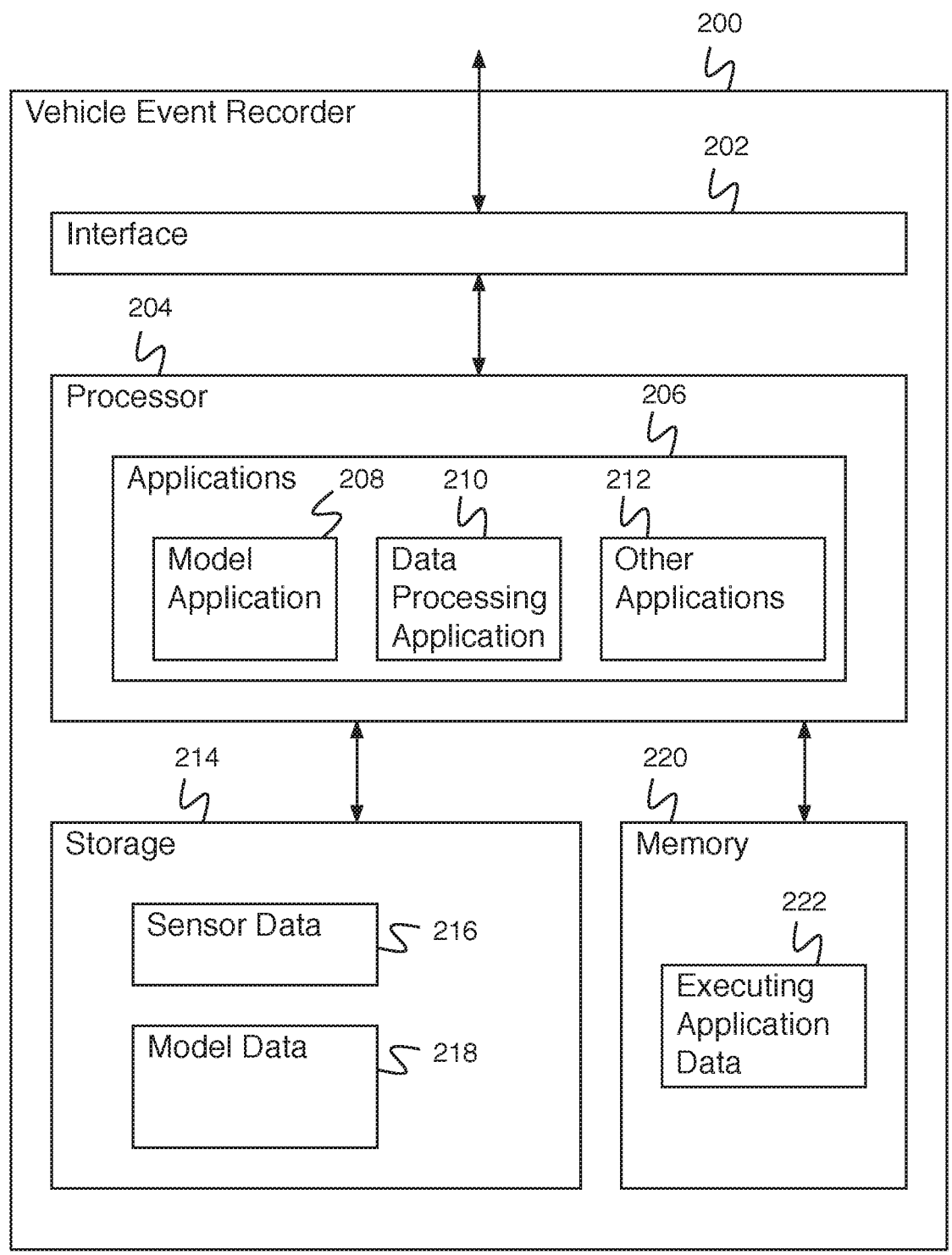
FIG. 2 is a block diagram illustrating an embodiment of a vehicle event recorder.

FIG. 2 is a block diagram illustrating an embodiment of a vehicle event recorder. In some embodiments, vehicle event recorder 200 comprises vehicle event recorder 102 of FIG. 1. In the example shown, vehicle event recorder 200 comprises interface 202. For example, interface 202 comprises an interface for receiving sensor data, receiving network communications, providing a sample rate, providing sensor data, providing communications, etc. Processor 204 comprises a processor for executing applications 206. Applications 206 comprise model application 208, data processing application 210, and other applications 212. Model application 208 comprises an application for determining a set of sample rates using a model. For example, model application 208 comprises a model configured to determine one or more sampling rates for a second set of sensors based at least in part on input data from a first set of sensors, wherein the first set of sensors and the second set of sensors are mounted on a vehicle, provide the one or more sampling rates to the second set of sensors, and store data from the second set of sensors in a storage memory. Data processing application 210 comprises an application for processing data—for example, filtering data, changing a data sample rate, identifying anomalous events based on data, etc. Other applications 212 comprise any other appropriate applications (e.g., a communications application, a data storage and retrieval application, a web browser application, a user interface application, a data analysis application, etc.). Storage 214 comprises system sensor data 216 (e.g., sensor data received from a set of sensors) and model data 218 (e.g., data describing a model used by model application 208). Memory 220 comprises executing application data 222 comprising data associated with applications 206.

Figure 3:
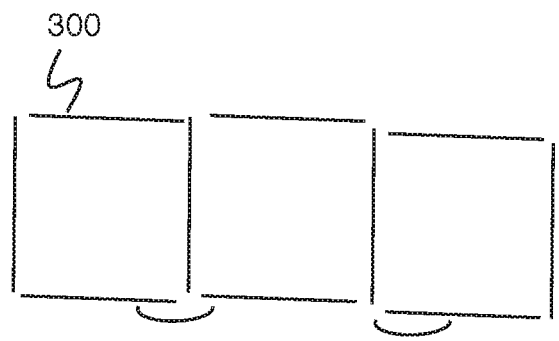
FIG. 3 is a diagram illustrating an embodiment of a use case for a system for adaptive storage.

FIG. 3 is a diagram illustrating an embodiment of a use case for a system for adaptive storage. Vehicle 300 comprises a vehicle event recorder. In some embodiments, the vehicle event recorder of vehicle 300 comprises vehicle event recorder 102 of FIG. 1. In the example shown, the vehicle event recorder of vehicle 300 comprises a system for adaptive storage using a model. The model receives a set of input data indicating that all sensors indicate no captured signals of interest. The model provides output data indicating all sensors should record data at a minimum sampling rate.

Figure 4:
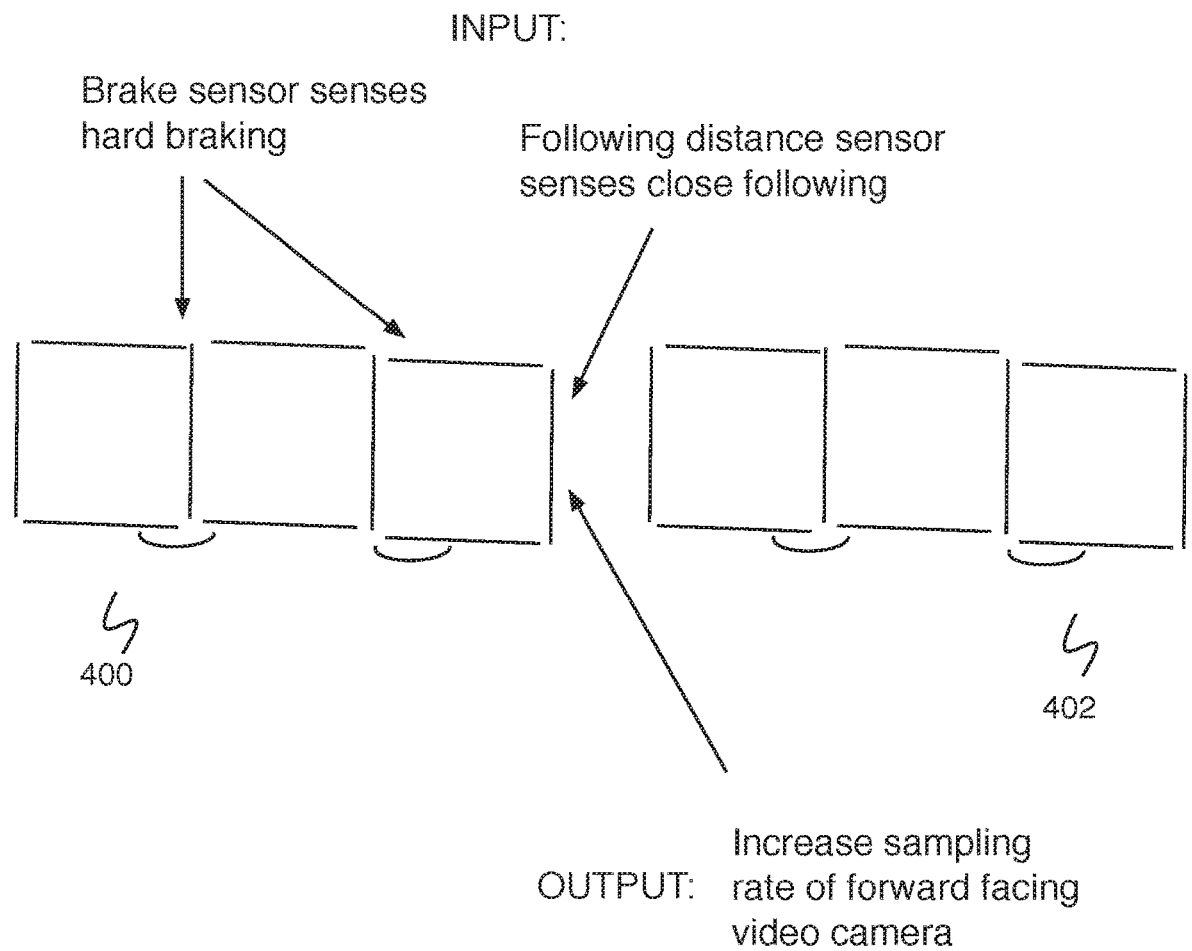
FIG. 4 is a diagram illustrating an embodiment of a use case for a system for adaptive storage.

FIG. 4 is a diagram illustrating an embodiment of a use case for a system for adaptive storage. Vehicle 400 comprises a vehicle event recorder. In some embodiments, the vehicle event recorder of vehicle 400 comprises vehicle event recorder 102 of FIG. 1. In the example shown, the vehicle event recorder of vehicle 400 comprises a system for adaptive storage using a model. Vehicle 400 is following close behind vehicle 402 and is forced to stop quickly. The model receives a set of input data indicating a brake sensor senses hard braking or a following distance sensor senses close following. The model provides output data indicating that a forward facing video camera should increase its sampling rate (e.g., to a maximum sampling rate, to a predetermined sampling rate, up one increment, etc.). For example, the forward facing video camera increases its sampling rate in order to allow for license plate identification or other forensics in case of an accident.

In some embodiments, the model receives a set of input data indicating that some sensors (e.g., a subset of all sensors) indicate that some of the captured signals are of interest. The model provides output data indicating that the sensors that are of interest (e.g., the subset of all sensors) should record data at a higher than minimum sampling rate (e.g., a maximum rate, a stepped up rate from the minimum sampling rate, a rate determined by the model, etc.) while the sensors that are not of interest should continue to capture data at a minimum sampling rate.

Figure 5:
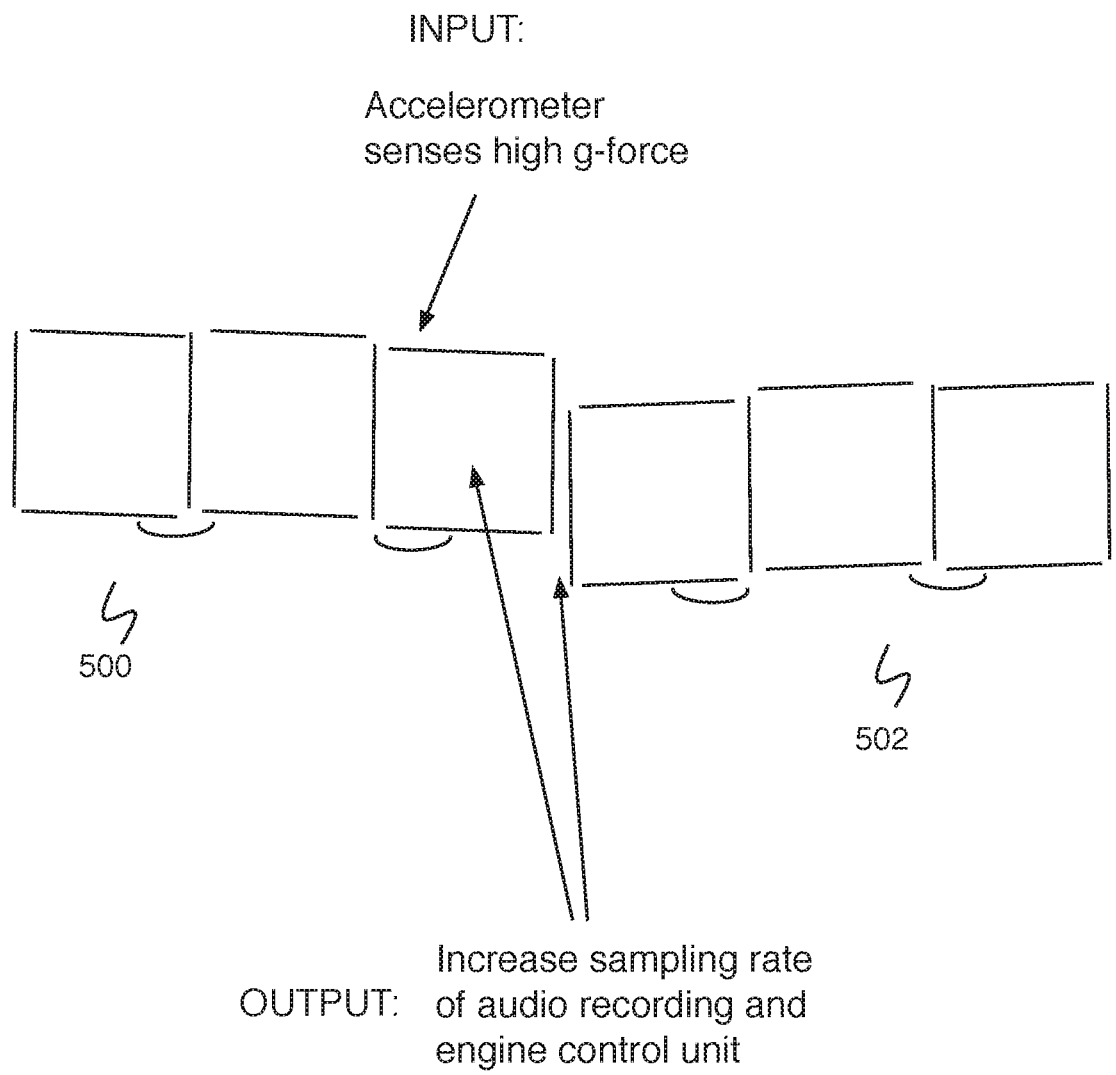
FIG. 5 is a diagram illustrating an embodiment of a use case for a system for adaptive storage.

FIG. 5 is a diagram illustrating an embodiment of a use case for a system for adaptive storage. Vehicle 500 comprises a vehicle event recorder. In some embodiments, the vehicle event recorder of vehicle 500 comprises vehicle event recorder 102 of FIG. 1. In the example shown, the vehicle event recorder of vehicle 500 comprises a system for adaptive storage using a model. Vehicle 500 encounters vehicle 502 in a head-on collision. The model receives a set of input data indicating an accelerometer senses a high g-force. The model provides output data indicating that an audio recorder (e.g., an external microphone) and an engine control unit should increase their sampling rates. For example, the audio recorder and ECU increase their sampling rate in order to be able to confirm a possible collision.

In some embodiments, the model receives a set of input data indicating that some sensors (e.g., a subset of all sensors) indicate that some of the captured signals are of interest. The model provides output data indicating that the sensors that are of interest (e.g., the subset of all sensors) should record data at a higher than minimum sampling rate (e.g., a maximum rate, a stepped up rate from the minimum sampling rate, a rate determined by the model, etc.) while the sensors that are not of interest should continue to capture data at a minimum sampling rate.

In some embodiments, the system captures data at a high sampling rate. The model receives a set of input data indicating that some sensors (e.g., a subset of all sensors) indicate that some of the captured signals are of interest. The model provides output data indicating that the sensors that are of interest (e.g., the subset of all sensors) should keep the data recorded at the higher sampling rate (e.g., a maximum rate, a stepped up rate from the minimum sampling rate, a rate determined by the model, etc.), while the sensors that are not of interest should be processed to reduce their sampling rate, the resolution, or both so that the stored data is reduced from the stored data at the higher sampling rate. In some embodiments, the data is processed by moving the data from a buffer (e.g., a short term solid state memory) to a more permanent storage and either moving it at a high resolution or a high sampling rate or both and storing the data in the more permanent storage or lowering its resolution or lowering its sample rate or both prior to storing the data in the more permanent storage (e.g., in a disc or hard drive of a vehicle event recorder).

Figure 6:
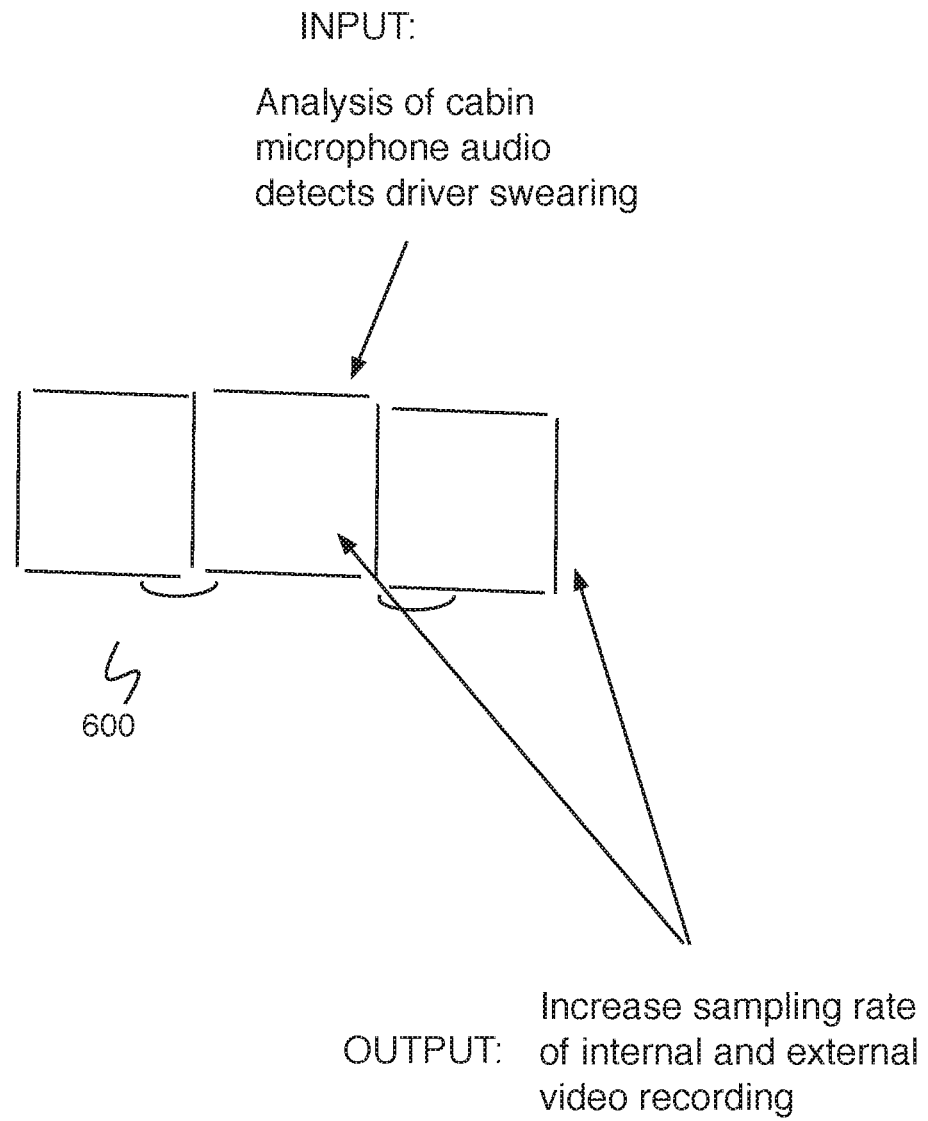
FIG. 6 is a diagram illustrating an embodiment of a use case for a system for adaptive storage.

FIG. 6 is a diagram illustrating an embodiment of a use case for a system for adaptive storage. Vehicle 600 comprises a vehicle event recorder. In some embodiments, the vehicle event recorder of vehicle 600 comprises vehicle event recorder 102 of FIG. 1. In the example shown, the vehicle event recorder of vehicle 600 comprises a system for adaptive storage using a model. The model receives a set of input data indicating an analysis of cabin microphone data detects the driver swearing. For example, an analysis of the audio stream from a cabin microphone matches the vocal patterns to recognize swear word patterns, high volume vocal volume over a short period of time, or any other appropriate sound signature. The model provides output data indicating that internal and external video cameras should increase sampling rate (e.g., to a maximum sampling rate, to a predetermined sampling rate, up one increment, etc.). For example, the internal and external video cameras increase their sampling rate in order to better analyze the environment and the behavior of the driver.

Figure 7:
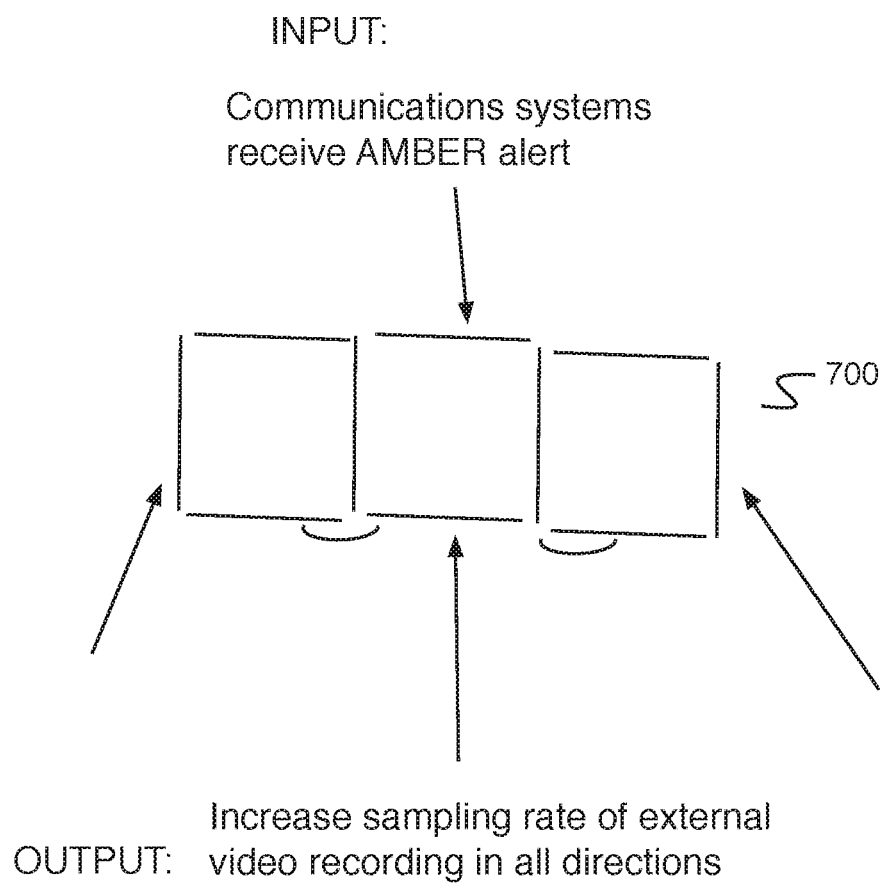
FIG. 7 is a diagram illustrating an embodiment of a use case for a system for adaptive storage.

FIG. 7 is a diagram illustrating an embodiment of a use case for a system for adaptive storage. Vehicle 700 comprises a vehicle event recorder. In some embodiments, the vehicle event recorder of vehicle 700 comprises vehicle event recorder 102 of FIG. 1. In the example shown, the vehicle event recorder of vehicle 700 comprises a system for adaptive storage using a model. The model receives a set of input data indicating a communications system has received an AMBER alert (e.g., a child abduction alert, a vehicle alert, etc.). The model provides output data indicating that external video cameras in all directions should increase sampling rate (e.g., to a maximum sampling rate, to a predetermined sampling rate, up one increment, etc.). For example, the external video cameras increase their sampling rate in order to better determine whether a missing child or vehicle of an alert is observed.

Figure 8:
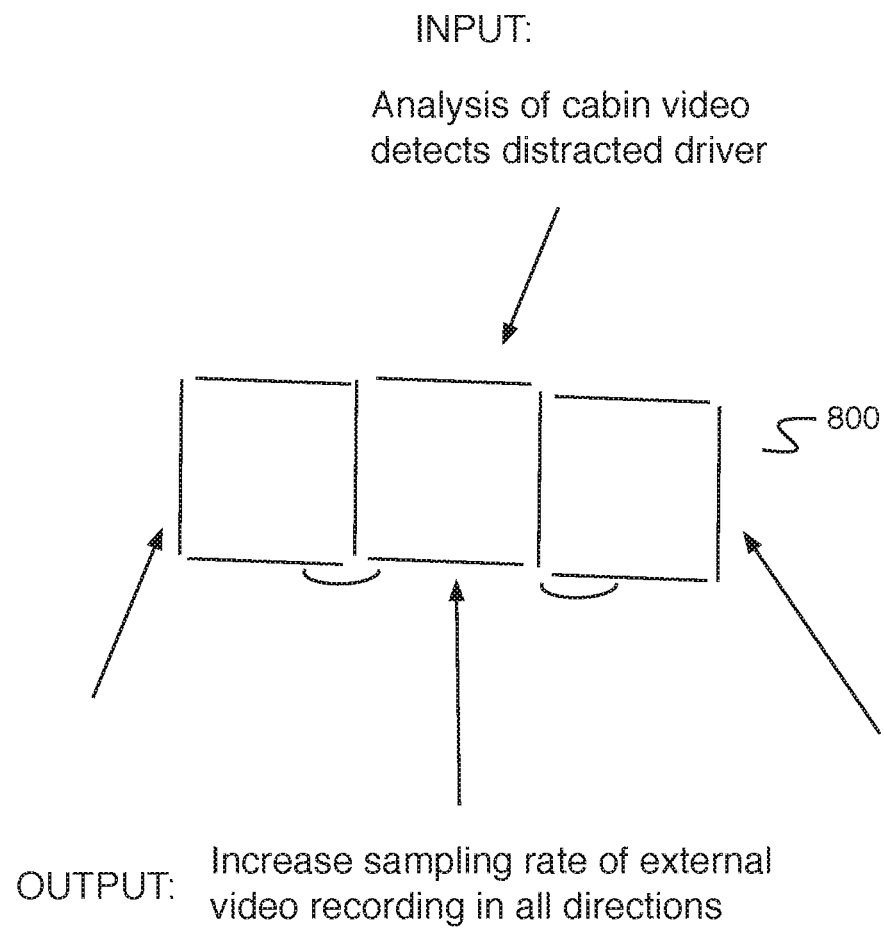
FIG. 8 is a diagram illustrating an embodiment of a use case for a system for adaptive storage.

FIG. 8 is a diagram illustrating an embodiment of a use case for a system for adaptive storage. Vehicle 800 comprises a vehicle event recorder. In some embodiments, the vehicle event recorder of vehicle 800 comprises vehicle event recorder 102 of FIG. 1. In the example shown, the vehicle event recorder of vehicle 800 comprises a system for adaptive storage using a model. The model receives a set of input data indicating an analysis of cabin video data detects a distracted driver. For example, the driver is wandering across a lane marker x times within a time period, the driver is detected to be not looking forward out the window while driving (e.g., a gaze detection is not forward for a period of a time), etc. The model provides output data indicating that external video cameras in all directions should increase sampling rate (e.g., to a maximum sampling rate, to a predetermined sampling rate, up one increment, etc.). For example, the external video cameras increase their sampling rate in order to better understand the outside environment when the driver is distracted.

Figure 9:
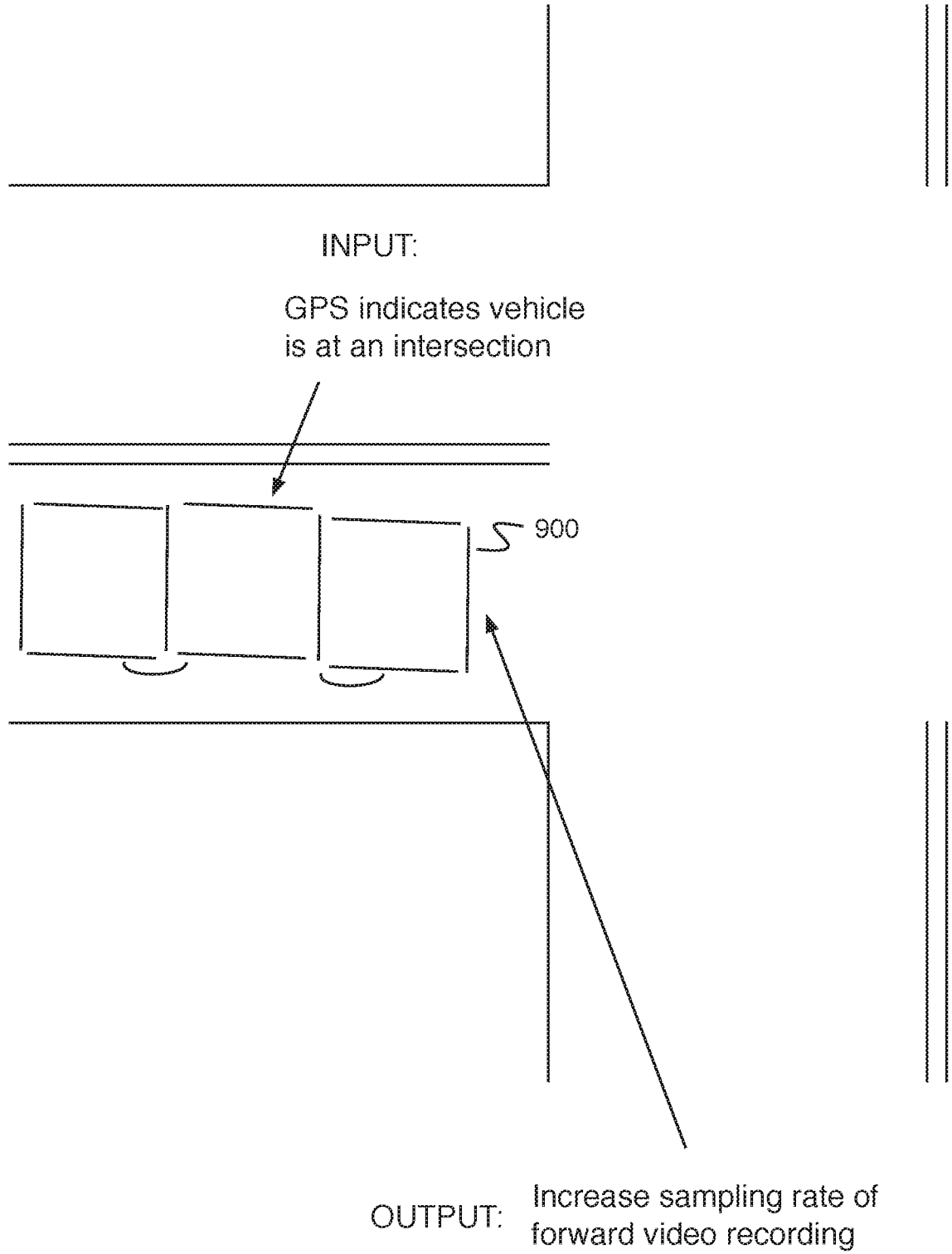
FIG. 9 is a diagram illustrating an embodiment of a use case for a system for adaptive storage.

FIG. 9 is a diagram illustrating an embodiment of a use case for a system for adaptive storage. Vehicle 900 comprises a vehicle event recorder. In some embodiments, the vehicle event recorder of vehicle 900 comprises vehicle event recorder 102 of FIG. 1. In the example shown, the vehicle event recorder of vehicle 900 comprises a system for adaptive storage using a model. The model receives a set of input data indicating that a GPS (e.g., in combination with map data) indicates the vehicle is at an intersection. The model provides output data indicating that forward facing video cameras should increase sampling rate (e.g., to a maximum sampling rate, to a predetermined sampling rate, up one increment, etc.). For example, the forward facing video cameras increase their sampling rate in order to validate the driver legal compliance at the intersection.

Figure 10:
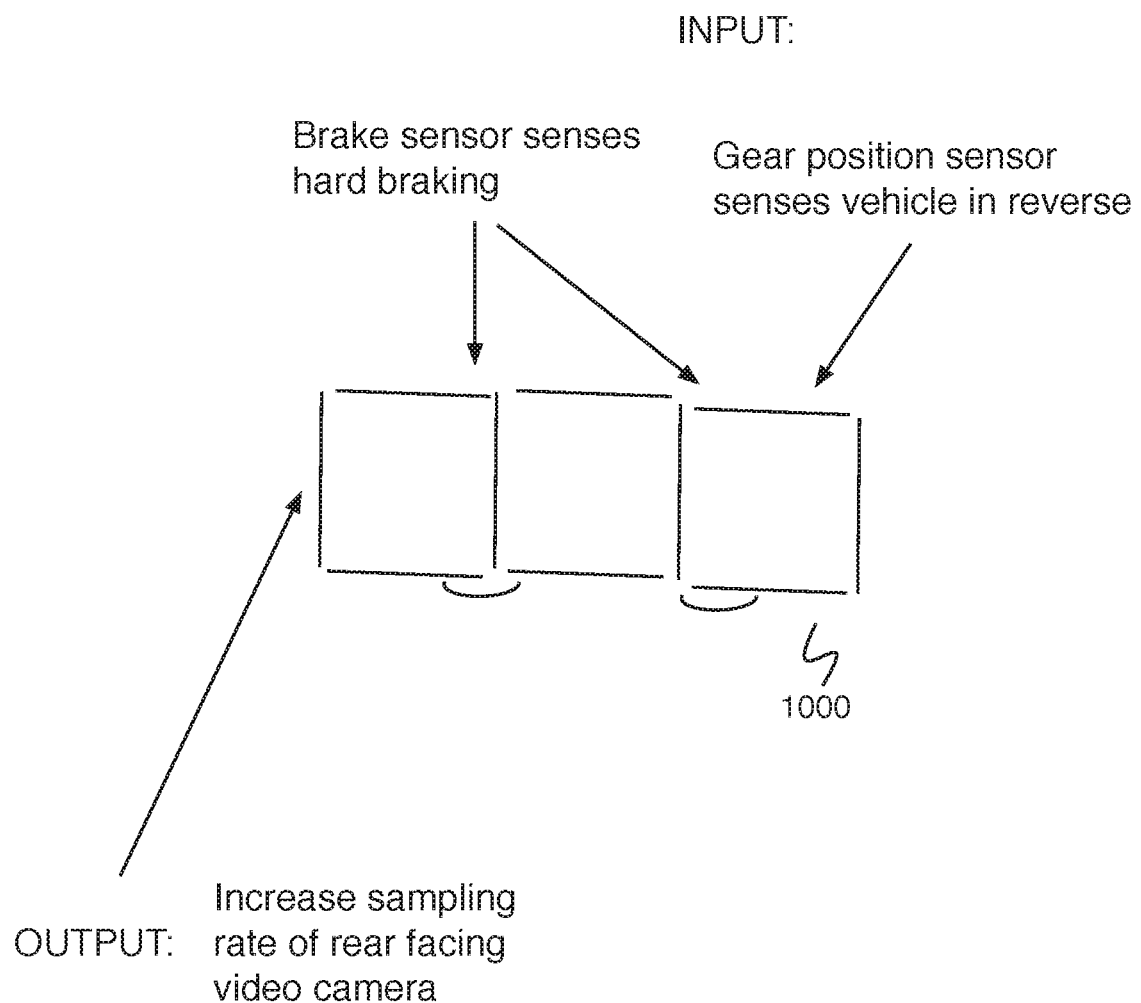
FIG. 10 is a diagram illustrating an embodiment of a use case for a system for adaptive storage.

FIG. 10 is a diagram illustrating an embodiment of a use case for a system for adaptive storage. Vehicle 1000 comprises a vehicle event recorder. In some embodiments, the vehicle event recorder of vehicle 1000 comprises vehicle event recorder 102 of FIG. 1. In the example shown, the vehicle event recorder of vehicle 1000 comprises a system for adaptive storage using a model. The model receives a set of input data indicating a brake sensor senses hard braking and a gear position sensor senses the vehicle is in reverse gear. The model provides output data indicating that a rear facing video camera (or cameras) should increase sampling rate (e.g., to a maximum sampling rate, to a predetermined sampling rate, up one increment, etc.). For example, the rear facing video camera increases its sampling rate in order to gather more data on a potentially risky situation.

Figure 11:
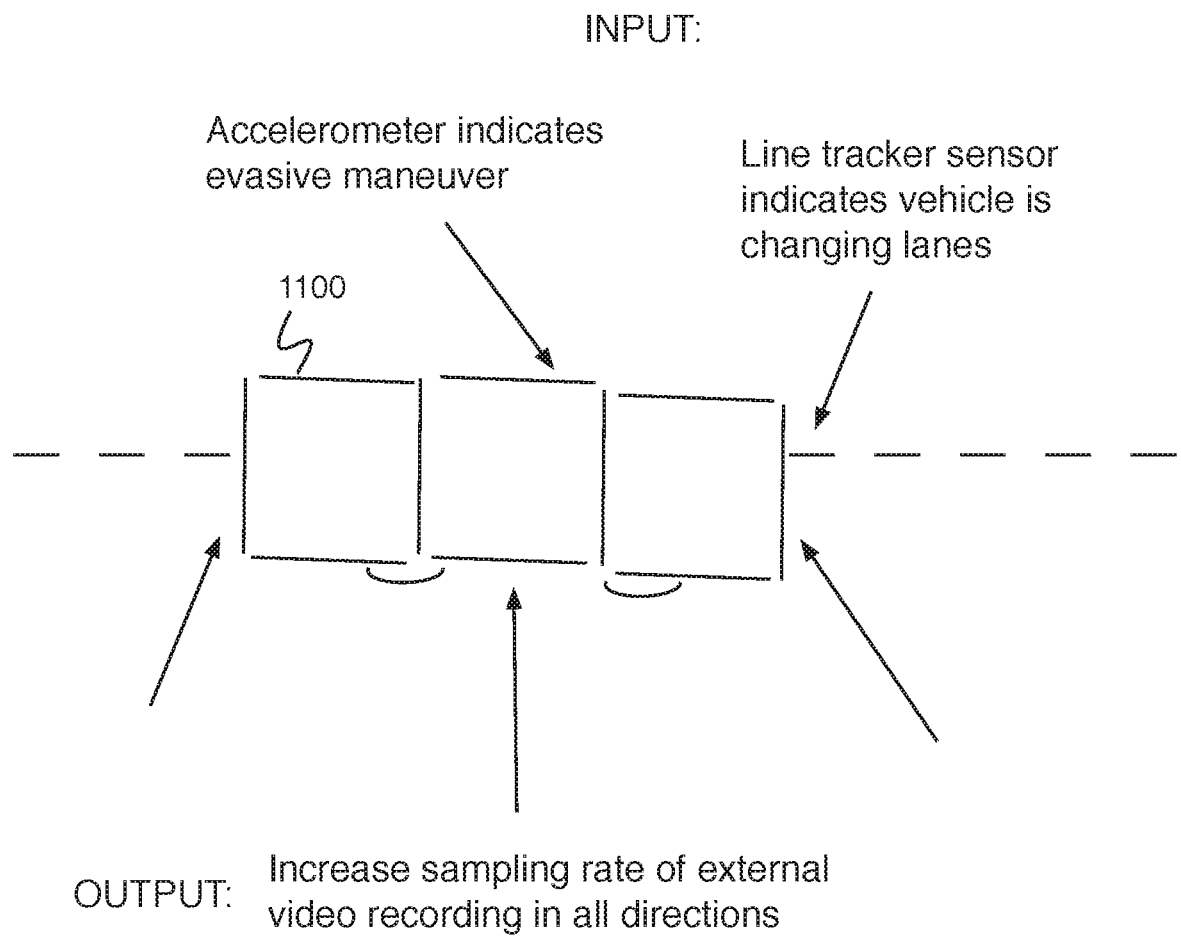
FIG. 11 is a diagram illustrating an embodiment of a use case for a system for adaptive storage.

FIG. 11 is a diagram illustrating an embodiment of a use case for a system for adaptive storage. Vehicle 1100 comprises a vehicle event recorder. In some embodiments, the vehicle event recorder of vehicle 1100 comprises vehicle event recorder 102 of FIG. 1. In the example shown, the vehicle event recorder of vehicle 1100 comprises a system for adaptive storage using a model. The model receives a set of input data indicating analysis of accelerometer data indicates an evasive maneuver is occurring and a line tracker sensor indicates a vehicle is changing lanes. The model provides output data indicating that external video cameras in all directions should increase sampling rate (e.g., to a maximum sampling rate, to a predetermined sampling rate, up one increment, etc.). For example, the external video cameras increase their sampling rate in order to more likely be able to identify the license plate of the vehicle that created the necessity for the evasive maneuver.

Figure 12:
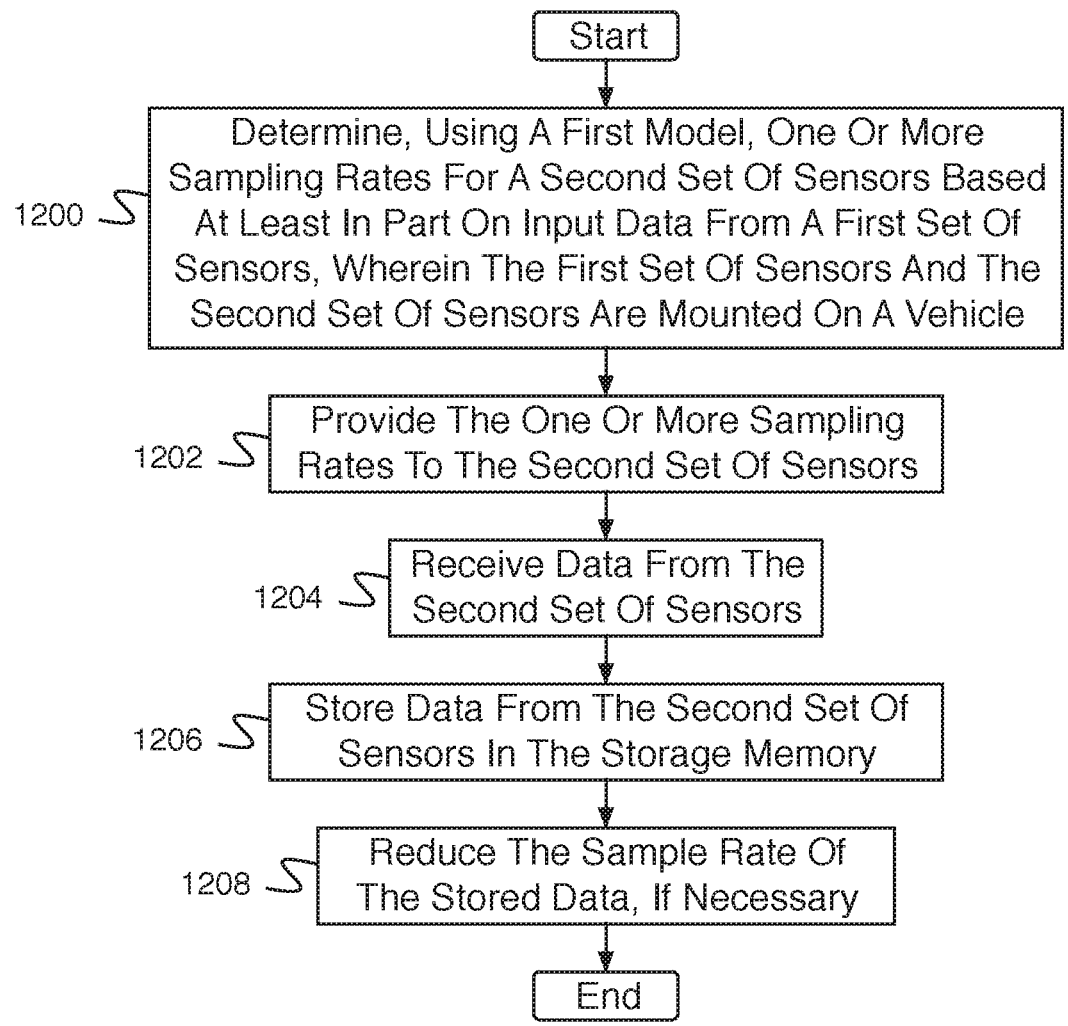
FIG. 12 is a flow diagram illustrating an embodiment of a process for adaptive storage.

FIG. 12 is a flow diagram illustrating an embodiment of a process for adaptive storage. In some embodiments, the process of FIG. 12 is executed by vehicle event recorder 102 of FIG. 1. In the example shown, in 1200, the process determines, using a first model, one or more sampling rates for a second set of sensors based at least in part on input data from a first set of sensors, wherein the first set of sensors and the second set of sensors are mounted on a vehicle. For example, the model comprises a machine learning model, a deep learning model, a neural network, etc. The model comprises a model trained using data representing use cases wherein it is desired that one or more sampling rates change in response to inputs. In 1202, the one or more sampling rates are provided to the second set of sensors. In 1204, the one or more sampling rates are provided to the second set of sensors. In 1204, data is received from the second set of sensors. For example, the data comprises data sampled according to the one or more sampling rates. In 1206, data from the second set of sensors is stored in the storage memory. In 1208, the sample rate of the stored data is reduced, if necessary.

Figure 13:
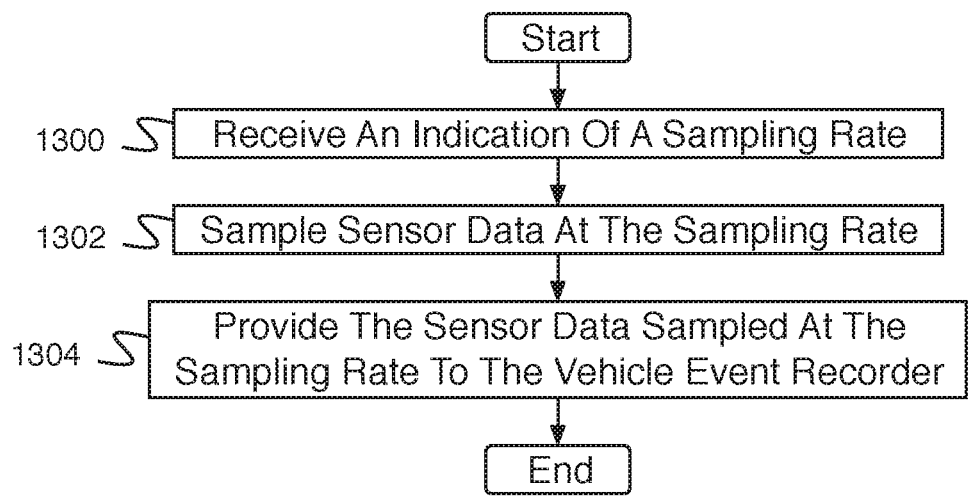
FIG. 13 is a flow diagram illustrating an embodiment of a process for a sensor.

FIG. 13 is a flow diagram illustrating an embodiment of a process for a sensor. In some embodiments, the process of FIG. 13 is executed by a sensor of vehicle sensors 104 of FIG. 1. In the example shown, in 1300, an indication of a sample rate is received. For example, an indication of a sample rate is received from a vehicle event recorder. In 1302, sensor data is sampled at the sampling rate. For example, control electronics associated with the sensor capture data from the sample at a rate indicated by the sampling rate. In 1304, the sensor data sampled at the sampling rate is provided to the vehicle event recorder.

Figure 14:
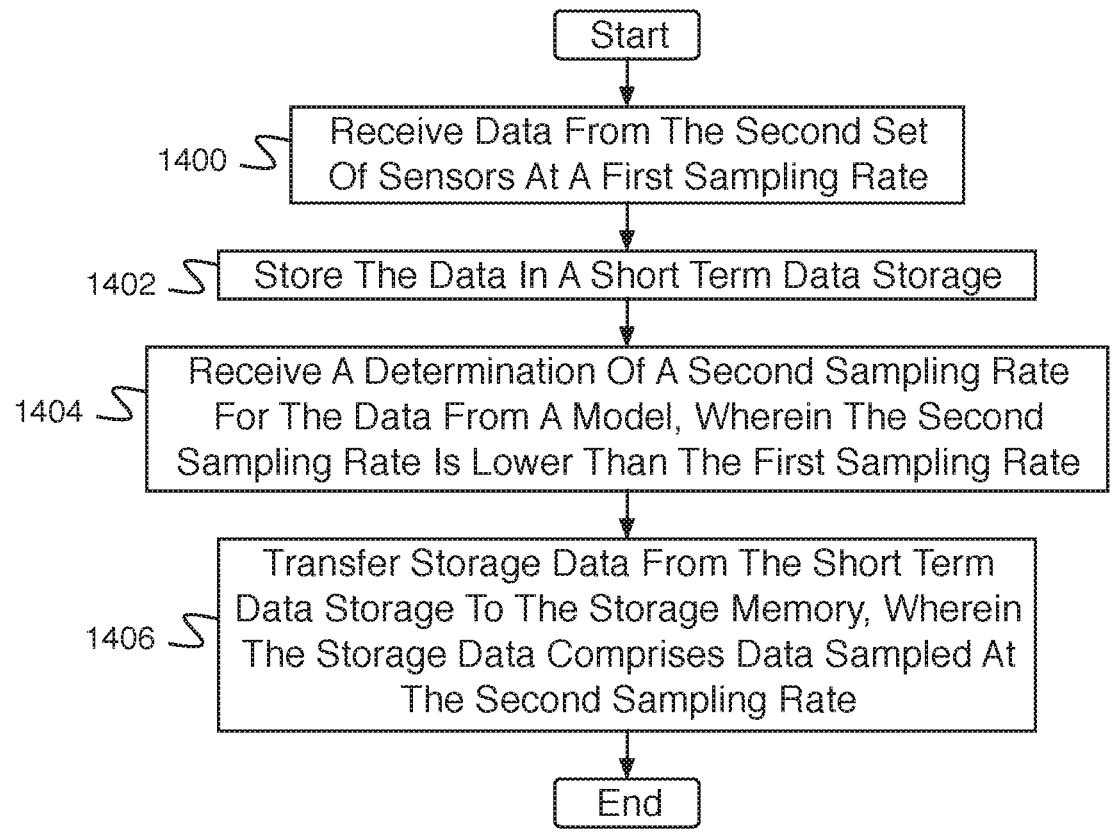
FIG. 14 is a flow diagram illustrating an embodiment of a process for storing data.

FIG. 14 is a flow diagram illustrating an embodiment of a process for storing data. In some embodiments, the process of FIG. 14 implements 1206 of FIG. 12. In the example shown, in 1400, data is received from the second set of sensors at a first sampling rate. In 1402, the data is stored in a short term data storage. In 1404, a determination of a second sampling rate for the data is received from a model, wherein the second sampling rate is lower than the first sampling rate. For instance, the second sampling rate is provided by the model in response to a determination that the required storage sample rate is less than the previously provided sample rate (e.g., the sample rate provided in 1202 of FIG. 2). In some embodiments, data for a sensor of the second set of sensors is recorded into the short term buffer at a first sampling rate and transferred to the storage memory at a second sampling rate, wherein the second sampling rate is lower than the first sampling rate in response to determining that an indication is received from the model to record data associated with the sensor at the second sampling rate. In 1406, storage data is transferred from the short term data storage to the storage memory, wherein the storage data comprises data sampled at the second sampling rate. For example, the storage data comprises a subset of the data samples received from the second set of sensors, the storage data comprises the data from the second set of sensors resampled to the second sampling rate, etc.

Figure 15:
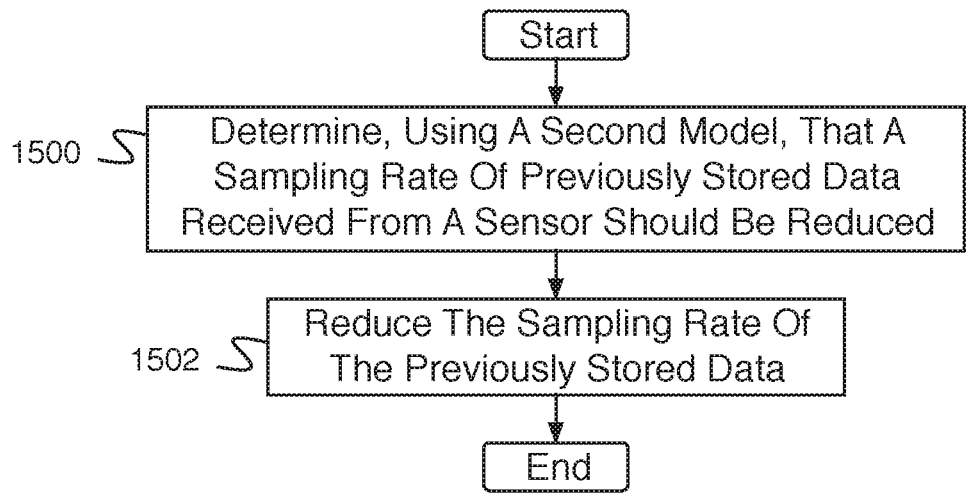
FIG. 15 is a flow diagram illustrating an embodiment of a process for reducing a sample rate of data.

FIG. 15 is a flow diagram illustrating an embodiment of a process for reducing a sample rate of data. In some embodiments, the process of FIG. 15 implements 1208 of FIG. 12. In the example shown, in 1500, it is determined, using a second model, that a sampling rate of previously stored data received from a sensor should be reduced. For example, the second model comprises a machine learning model, a deep learning model, or a neural network. The second model comprises a model trained using data representing use cases wherein it is desired to preserve or remove previously captured data. In 1502, the sampling rate of the previously stored data received is reduced. For example, a subset of the samples of the previously stored data are removed, the previously stored data is resampled to the reduced sample rate, etc.

Figure 16:
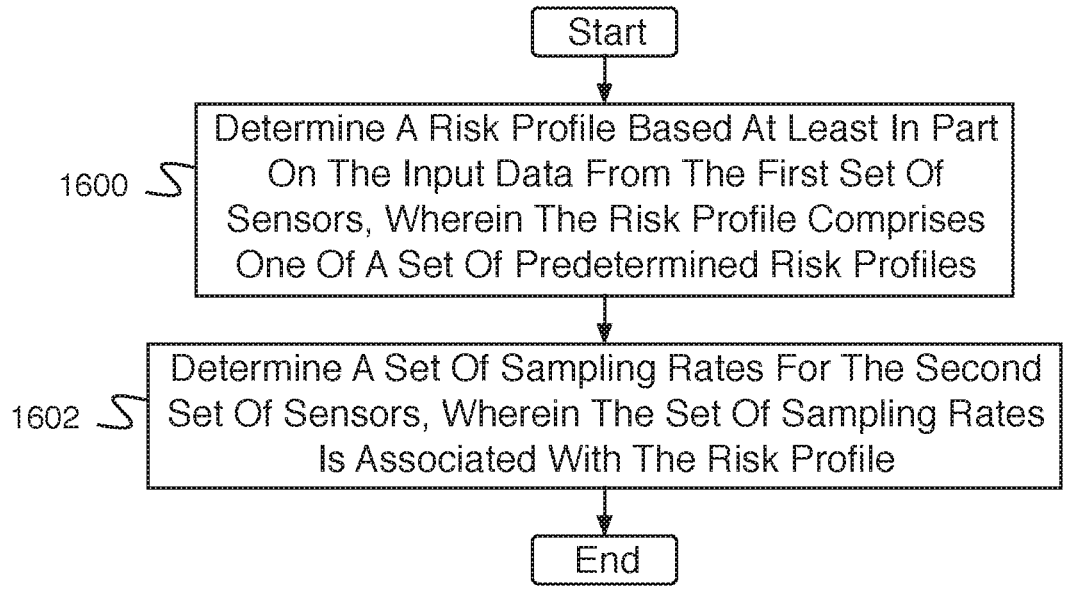
FIG. 16 is a flow diagram illustrating an embodiment of a process for determining a set of sample rates using risk profiles.

FIG. 16 is a flow diagram illustrating an embodiment of a process for determining a set of sample rates using risk profiles. In some embodiments, the process of FIG. 16 implements 1200 of FIG. 12. In the example shown, in 1600, a risk profile is determined based at least in part on the input data from the first set of sensors, wherein the risk profile comprises one of a set of predetermined risk profiles. In 1602, a set of sampling rates is determined for the second set of sensors, wherein the set of sampling rates is associated with the risk profile.

Figure 17:
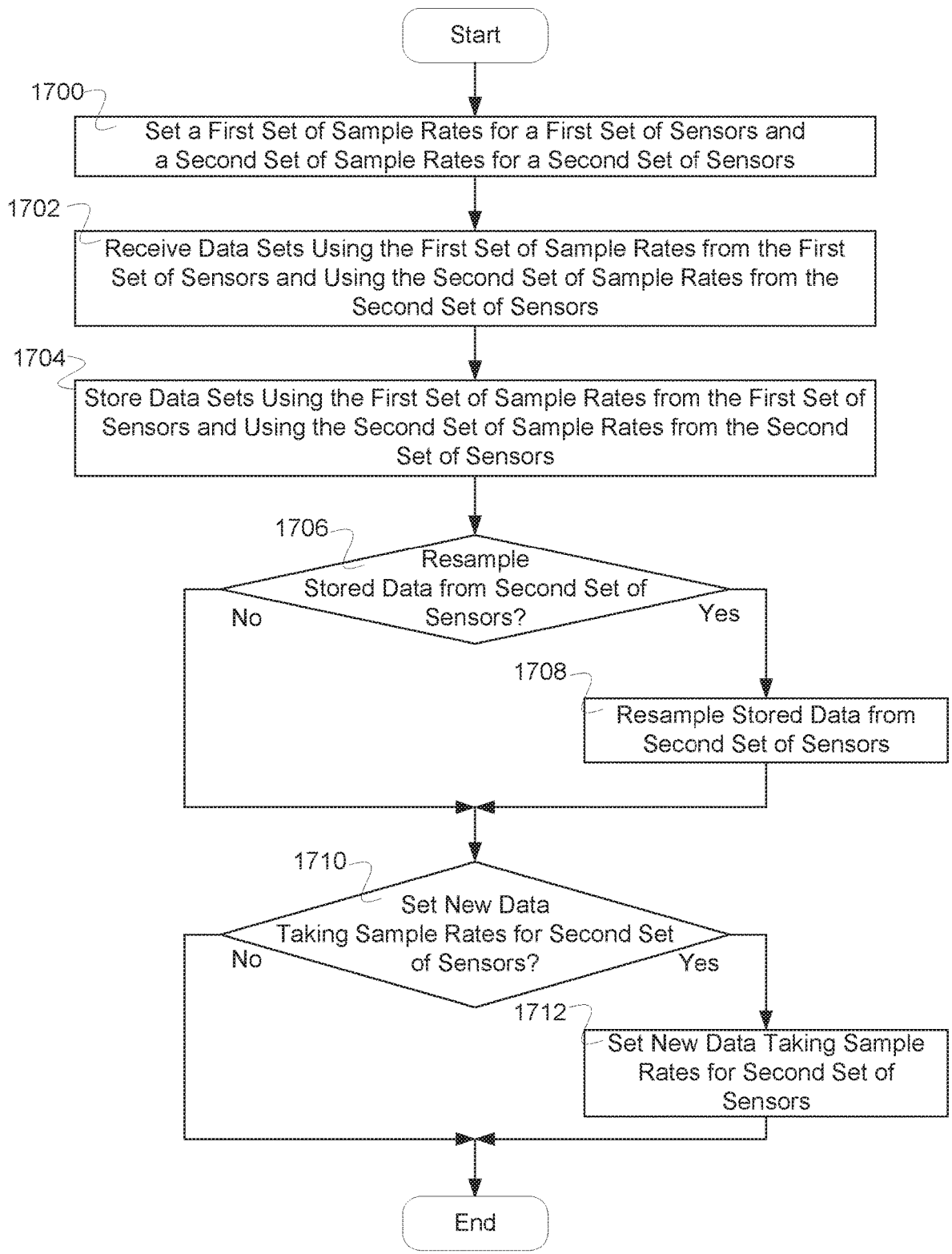
FIG. 17 is a flow diagram illustrating an embodiment of a process for resampling and for setting a sample rate.

FIG. 17 is a flow diagram illustrating an embodiment of a process for resampling and for setting a sample rate. In some embodiments, the process of FIG. 17 is executed by vehicle event recorder 102 of FIG. 1. In the example shown, in 1700 a first set of sample rates for a first set of sensors and a second set of sample rates for a second set of sensors are set. For example, data is taken from a first set of sensors with a selected first sample rate and data is taken from a second set of sensors with a selected second sample rate. In various embodiments, the first set of sensors and the second set of sensors have elements that are completely separate, partially overlapping, or the same. In 1702, data sets from the first set of sample rates from the first set of sensors and from the second set of sample rates from the second set of sensors are received. For example, data from the first set of sensors and the second set of sensors at a first set of sample rates and a second set of sample rates, respectively, are received. In 1704, the data sets using the first set of sample rates from the first set of sensors and using the second set of sample rates from the second set of sensors are stored. For example, the data from the first set of sensors and the second set of sensors is stored (e.g., stored in a buffer, stored on a hard drive, stored in a memory, etc.). In some embodiments, the data location for the sensors is stored in an index along with metadata indicating sampling rates.

In 1706, it is determined whether stored data from the second set of sensors should be resampled. For example, it is determined using a model whether the data from the second set of sensors that is stored (e.g., stored in a buffer or on disk or in a memory) should be resampled (e.g., resampled at a lower rate, lower resolution, or both) and stored (e.g., in a similar memory or a different memory—for example, from a buffer to a disk memory, etc.). In some embodiments, the model takes in data from the first set of sensors and/or the second set of sensors and this input data is used as inputs to determine whether to resample stored data to reduce the amount of data stored (e.g., predicting that the already stored data is not likely to be needed at the higher resolution/sample rate). In response to determining that stored data from the second set of sensors should be resampled, control passes to 1708. In response to determining that stored data from the second set of sensors should not be resampled, control passes to 1710. In 1708, stored data from the second set of sensors is resampled, and control passes to 1710. For example, data stored from the second set of sensors is read out and resampled at a lower sample rate or at a lower resolution and then stored in the same type of memory or in a different type of memory. In some embodiments, an index is updated to indicate the new storage location and/or metadata is updated associated with the stored data indicating the resampled rate and/or the original rate.

In 1710, it is determined whether to set new data taking sample rates for the second set of sensors. For example, a model is used to determine whether input data from the first set of sensors and/or the second set of sensors indicates that the sample rates for the second set of sensor should be changed (e.g., increased or decreased). In some embodiments, the model is determining an increased or decreased probability of an event of interest taking place and because of this increasing or decreasing, respectively, the sample rates of a set of sensors. In some embodiments, data from the set of sensors is used to determine new sample rates for the set of sensors. In some embodiments, data from a different set of sensors is used to determine new sample rates for a set of sensors. In response to determining to set new data taking sample rates for the second set of sensors, control passes to 1712. In response to determining not to set new data taking sample rates for the second set of sensors, the process ends. In 1712, new data taking sample rates for the second set of sensors are set, and the process ends. For example, each sensor of the second set of sensors has a new sample rate set for it.

In some embodiments, the data stored at the lower resolution or lower sampling rate, lowers the required storage space and/or the bandwidth required for transferring the data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for adaptive storage, comprising:
   a storage memory; and
   a processor configured to:
   determine, using a first model, one or more sampling rates for a second set of sensors based at least in part on input data from a first set of sensors, wherein the first set of sensors and the second set of sensors are mounted on a vehicle;
   provide the one or more sampling rates to the second set of sensors;
   store data from the second set of sensors in the storage memory;
   determine, using a second model, that a sampling rate of previously stored data should be reduced for the second set of sensors; and
   reduce one or more sampling rates of the previously stored data for the second set of sensors, comprising:
   perform one or more of:
   a) in response to a determination that an accelerometer sensor detects hard braking, a forward following distance sensor senses close following or both, omit reducing the one or more sampling rates of the previously stored data for the second set of sensors, wherein the second set of sensors includes a forward facing video sensor configured to allow for license plate identification in case of an accident, and wherein the first set of sensors comprises the accelerometer sensor or the forward following distance sensor;
   b) in response to a determination that the accelerometer sensor detects a high g-force, omit reducing the one or more sampling rates of the previously stored data for the second set of sensors, wherein the second set of sensors includes an audio recorder and an engine control unit (ECU) configured to confirm a possible collision, and wherein the first set of sensors comprises the accelerometer sensor;

c) in response to a determination that a Global Positioning System (GPS) sensor detects an intersection, omit reducing the one or more sampling rates of the previously stored data for the second set of sensors, wherein the second set of sensors includes an external video sensor configured to validate a driver legal compliance at the intersection, and wherein the first set of sensors comprises the GPS sensor;

d) in response to a determination that a brake pedal sensor detects hard braking and a gear position sensor senses the vehicle is in reverse gear, omit reducing the one or more sampling rates of the previously stored data for the second set of sensors, wherein the second set of sensors includes a rear video sensor configured to gather more data on a potentially risky situation, and wherein the first set of sensors comprises the brake pedal sensor and the gear position sensor; and/or e) in response to a determination that the accelerometer sensor detects an evasive maneuver and a lane change sensor indicates that the vehicle is changing lanes, omit reducing the one or more sampling rates of the previously stored data for the second set of sensors, wherein the second set of sensors includes an external video sensor configured to identify a license plate of a vehicle causing the evasive maneuver, and wherein the first set of sensors comprises the lane change sensor and the accelerometer sensor.

2. The system of claim 1, wherein one or more of the one or more sampling rates of the previously stored data comprise maximum rates.

3. The system of claim 1, wherein the system further comprises a short term buffer, wherein data for a sensor of the second set of sensors is recorded into the short term buffer and then transferred to the storage memory.

4. The system of claim 3, wherein data for a first sensor of the second set of sensors is recorded into the short term buffer at a first sampling rate and transferred to the storage memory at a second sampling rate, wherein the second sampling rate is lower than the first sampling rate in response to determining that an indication is received from the first model to record the data associated with the first sensor of the second set of sensors at the second sampling rate.

5. The system of claim 1, wherein the first set of sensors comprises all available sensors and the second set of sensors comprises all available sensors, and a model is configured to reduce a sampling rate associated with all available sensors to a minimum sampling rate in an event that no signals are detected.

6. The system of claim 1, wherein a risk profile is determined based at least in part on the input data from the first set of sensors, wherein the risk profile comprises one of a set of predetermined risk profiles.

7. The system of claim 6, wherein the risk profile is associated with a set of sampling rates for the second set of sensors.

8. The system of claim 1, wherein the decreasing of the one or more sampling rates of the previously stored data for the second set of sensors comprises to:

perform four or more of:

a) in response to the determination that the accelerometer sensor detects hard braking, the forward following distance sensor senses close following or both, omit reducing the one or more sampling rates of the previously stored data for the second set of sensors, wherein the second set of sensors includes the forward facing video sensor configured to allow for license plate identification in case of the accident, and wherein the first set of sensors comprises the accelerometer sensor or the forward following distance sensor;

b) in response to the determination that the accelerometer sensor detects the high g-force, omit reducing the one or more sampling rates of the previously stored data for the second set of sensors, wherein the second set of sensors includes the audio recorder and the engine control unit (ECU) configured to confirm the possible collision, and wherein the first set of sensors comprises the accelerometer sensor;

c) in response to the determination that the Global Positioning System (GPS) sensor detects the intersection, omit reducing the one or more sampling rates of the previously stored data for the second set of sensors, wherein the second set of sensors includes the external video sensor configured to validate the driver legal compliance at the intersection, and wherein the first set of sensors comprises the GPS sensor;

d) in response to the determination that the brake pedal sensor detects hard braking and the gear position sensor senses the vehicle is in reverse gear, omit reducing the one or more sampling rates of the previously stored data for the second set of sensors, wherein the second set of sensors includes the rear video sensor configured to gather more data on the potentially risky situation, and wherein the first set of sensors comprises the brake pedal sensor and the gear position sensor; and/or e) in response to the determination that the accelerometer sensor detects the evasive maneuver and the lane change sensor indicates that the vehicle is changing lanes, omit reducing the one or more sampling rates of the previously stored data for the second set of sensors, wherein the second set of sensors includes the external video sensor configured to identify the license plate of the vehicle causing the evasive maneuver, and wherein the first set of sensors comprises the lane change sensor and the accelerometer sensor.

9. The system of claim 1, wherein the decreasing of the one or more sampling rates of the previously stored data for the second set of sensors comprises to:

perform the following:

a) in response to the determination that the accelerometer sensor detects hard braking, the forward following distance sensor senses close following or both, omit reducing the one or more sampling rates of the previously stored data for the second set of sensors, wherein the second set of sensors includes the forward facing video sensor configured to allow for license plate identification in case of the accident, and wherein the first set of sensors comprises the accelerometer sensor or the forward following distance sensor;

b) in response to the determination that the accelerometer sensor detects the high g-force, omit reducing the one or more sampling rates of the previously stored data for the second set of sensors, wherein the second set of sensors includes the audio recorder and the engine control unit (ECU) configured to confirm the possible collision, and wherein the first set of sensors comprises the accelerometer sensor;
c) in response to the determination that the Global Positioning System (GPS) sensor detects the intersection, omit reducing the one or more sampling rates of the previously stored data for the second set of sensors, wherein the second set of sensors includes the external video sensor configured to validate the driver legal compliance at the intersection, and wherein the first set of sensors comprises the GPS sensor;
d) in response to the determination that the brake pedal sensor detects hard braking and the gear position sensor senses the vehicle is in reverse gear, omit reducing the one or more sampling rates of the previously stored data for the second set of sensors, wherein the second set of sensors includes the rear video sensor configured to gather more data on the potentially risky situation, and wherein the first set of sensors comprises the brake pedal sensor and the gear position sensor; and
e) in response to the determination that the accelerometer sensor detects the evasive maneuver and the lane change sensor indicates that the vehicle is changing lanes, omit reducing the one or more sampling rates of the previously stored data for the second set of sensors, wherein the second set of sensors includes the external video sensor configured to identify the license plate of the vehicle causing the evasive maneuver, and wherein the first set of sensors comprises the lane change sensor and the accelerometer sensor.

10. A method for adaptive storage, comprising:
determining, using a processor executing a first model, one or more sampling rates for a second set of sensors based at least in part on input data from a first set of sensors, wherein the first set of sensors and the second set of sensors are mounted on a vehicle;
providing the one or more sampling rates to the second set of sensors;
storing data from the second set of sensors in storage memory; and
determining, using a second model, that a sampling rate of previously stored data should be reduced for the second set of sensors; and
reducing one or more sampling rates of the previously stored data for the second set of sensors, comprising: performing one or more of:
  a) in response to a determination that an accelerometer sensor detects hard braking, a forward following distance sensor senses close following or both, omitting to reduce the one or more sampling rates of the previously stored data for the second set of sensors, wherein the second set of sensors includes a forward facing video sensor configured to allow for license plate identification in case of an accident, and wherein the first set of sensors comprises the accelerometer sensor or the forward following distance sensor;
  b) in response to a determination that the accelerometer sensor detects a high g-force, omitting to reduce the one or more sampling rates of the previously stored data for the second set of sensors, wherein the second set of sensors includes an audio recorder and an engine control unit (ECU) configured to confirm a possible collision, and wherein the first set of sensors comprises the accelerometer sensor;
  c) in response to a determination that a Global Positioning System (GPS) sensor detects an intersection, omitting to reduce the one or more sampling rates of the previously stored data for the second set of sensors, wherein the second set of sensors includes an external video sensor configured to validate a driver legal compliance at the intersection, and wherein the first set of sensors comprises the GPS sensor;
  d) in response to a determination that a brake pedal sensor detects hard braking and a gear position sensor senses the vehicle is in reverse gear, omitting to reduce the one or more sampling rates of the previously stored data for the second set of sensors, wherein the second set of sensors includes a rear video sensor configured to gather more data on a potentially risky situation, and wherein the first set of sensors comprises the brake pedal sensor and the gear position sensor; and/or
  e) in response to a determination that the accelerometer sensor detects an evasive maneuver and a lane change sensor indicates that the vehicle is changing lanes, omitting to reduce the one or more sampling rates of the previously stored data for the second set of sensors, wherein the second set of sensors includes an external video sensor configured to identify a license plate of a vehicle causing the evasive maneuver, and wherein the first set of sensors comprises the lane change sensor and the accelerometer sensor.

11. A computer program product for adaptive storage, the computer program product being embodied in a non-transitory computer readable storage medium and comprising computer instructions for:
determining, using a first model, one or more sampling rates for a second set of sensors based at least in part on input data from a first set of sensors, wherein the first set of sensors and the second set of sensors are mounted on a vehicle;
providing the one or more sampling rates to the second set of sensors;
storing data from the second set of sensors in storage memory; and
determining, using a second model, that a sampling rate of previously stored data should be reduced for the second set of sensors; and
reducing one or more sampling rates of the previously stored data for the second set of sensors, comprising: performing one or more of:
  a) in response to a determination that an accelerometer sensor detects hard braking, a forward following distance sensor senses close following or both, omitting to reduce the one or more sampling rates of the previously stored data for the second set of sensors, wherein the second set of sensors includes a forward facing video sensor configured to allow for license plate identification in case of an accident, and wherein the first set of sensors comprises the accelerometer sensor or the forward following distance sensor;
  b) in response to a determination that the accelerometer sensor detects a high g-force, omitting to reduce the one or more sampling rates of the previously stored data for the second set of sensors, wherein the second set of sensors includes an audio recorder and an engine control unit (ECU) configured to confirm a possible collision, and wherein the first set of sensors comprises the accelerometer sensor;

c) in response to a determination that a Global Positioning System (GPS) sensor detects an intersection, omitting to reduce the one or more sampling rates of the previously stored data for the second set of sensors, wherein the second set of sensors includes an external video sensor configured to validate a driver legal compliance at the intersection, and wherein the first set of sensors comprises the GPS sensor;

d) in response to a determination that a brake pedal sensor detects hard braking and a gear position sensor senses the vehicle is in reverse gear, omitting to reduce the one or more sampling rates of the previously stored data for the second set of sensors, wherein the second set of sensors includes a rear video sensor configured to gather more data on a potentially risky situation, and wherein the first set of sensors comprises the brake pedal sensor and the gear position sensor; and/or e) in response to a determination that the accelerometer sensor detects an evasive maneuver and a lane change sensor indicates that the vehicle is changing lanes, omitting to reduce the one or more sampling rates of the previously stored data for the second set of sensors, wherein the second set of sensors includes an external video sensor configured to identify a license plate of a vehicle causing the evasive maneuver, and wherein the first set of sensors comprises the lane change sensor and the accelerometer sensor.

* * * * *